United States Patent [19]

Silcox et al.

[11] Patent Number: 5,156,370
[45] Date of Patent: Oct. 20, 1992

[54] METHOD AND APPARATUS FOR MINIMIZING MULTIPLE DEGREE OF FREEDOM VIBRATION TRANSMISSION BETWEEN TWO REGIONS OF A STRUCTURE

[75] Inventors: Richard J. Silcox, Poquoson; Chris R. Fuller, Hampton; Gary P. Gibbs, Chesapeake, all of Va.

[73] Assignee: The United States of America as represented by the Administrator of the National Aeronautics and Space Administration, Washington, D.C.

[21] Appl. No.: 664,194

[22] Filed: Mar. 4, 1991

[51] Int. Cl.$^5$ .................. G05D 15/01; G05D 19/01
[52] U.S. Cl. ............................ 248/550; 73/579; 73/668; 318/649; 318/648
[58] Field of Search .......... 73/579, 583, 587, 578, 73/577, 594, 597, 649, 650, 662, 756, 668; 248/550; 318/649, 648

[56] References Cited

U.S. PATENT DOCUMENTS

| | | | |
|---|---|---|---|
| 2,443,471 | 6/1948 | Mason | 74/574 |
| 3,974,364 | 8/1976 | Sallberg et al. | 73/577 |
| 4,429,496 | 2/1984 | Masri | 248/638 |
| 4,446,733 | 5/1984 | Okubo | 73/579 |
| 4,525,791 | 6/1985 | Hagiwara et al. | 73/579 |
| 4,795,123 | 1/1989 | Forward et al. | 73/668 |
| 4,901,573 | 2/1990 | Srinivasan et al. | 73/579 |

OTHER PUBLICATIONS

Stephen J. Elliott et al., "A Multiple Error LMS Algorithm and its Application to the Active Control of Sound and Vibration", *IEEE Transactions on Acoustics, Speech and Signal Processing*, vol. ASSP-35, No. 10, Oct. 1987, pp. 1423-1434.
D. J. Pines et al., "Active Control of Bending Wave Propagation at Acoustic Frequencies", Department of Aeronautics and Astronautice, Massachusetts Institute of Technology, Cambridge, Mass., WA7-11:15, pp. 221-229.
Edward F. Crawley et al., "Use of Piezoelectric Actuators as Elements of Intelligent Structure", *AIAA Journal*, vol. 25, No. 10, Oct. 1987, pp. 1373-1385.
Leonard Meirovitch et al., "Vibration Control", *Inter-Noise*, Department of Engineering Science and Mechanics, VPI&SU, Blackburg, Va., (Honolu'u, USA, Dec. 3-5, 1984), pp. 477-482.
A. H. von Flotow et al., "Wave-Absorbing Controllers for a Flexible Beam", *J. Guidance*, vol. 9, No. 6, Nov.–Dec. 1986, pp. 673-680.
Redman-White et al., "Experiments on the Active Control of Flexural Wave Power Flow", *Journal of Sound and Vibration*, (1987), 112(1), pp. 187-191.

*Primary Examiner*—Hezron E. Williams
*Assistant Examiner*—Rose M. Finley
*Attorney, Agent, or Firm*—Kevin B. Osborne

[57] ABSTRACT

Arrays of actuators are affixed to structural elements to impede the transmission of vibrational energy. A single pair is used to provide control of bending and extensional waves and two pairs are used to control torsional motion in addition to these two types of wave motion. The arrays are applied to a wide variety of structural elements such as a beam structure that is part of larger framework that may or may not support a rigid or non-rigid skin. Electrical excitation is applied to the actuators that generate forces on the structure. These electrical inputs may be adjusted in their amplitude and phase by a controller in communication with appropriate vibrational wave sensors to impede the flow of vibrational power in all of the above mentioned wave forms beyond the actuator location. Additional sensor elements can be used to monitor the performance and adjust the electrical inputs to maximize the attenuation of vibrational energy.

16 Claims, 6 Drawing Sheets

METHOD AND APPARATUS FOR MINIMIZING MULTIPLE DEGREE OF FREEDOM VIBRATION TRANSMISSION BETWEEN TWO REGIONS OF A STRUCTURE

ORIGIN OF THE INVENTION

The invention described herein was made jointly in the performance of work under NASA Grant No. NAG-1-390 and an employee of the U.S. Government. In accordance with 35 U.S.C. 202, the grantee elected not to retain title.

BACKGROUND OF THE INVENTION

1. Technical Field of the Invention

The present invention relates generally to the control of vibration transmission and more particularly to the control of vibrational energy propagating or transmitting within structural elements such as beams and more complicated frameworks comprised of such elements.

2. Discussion of the Related Art

In many aerospace and marine structures, vibration generated by attached machinery is a significant problem. Often these structure-borne vibrations travel through the structure in the various forms of flexural, extensional and torsional waves and ultimately radiate as undesirable sound. Passive techniques such as constrained layer damping, involving bonding a visco-elastic material on the structure to dissipate vibrational energy, and the more traditional addition of mass and-/or stiffness to the structure have been used in an attempt to reduce this sound. However, these techniques have an inherent weight penalty and are often ineffective in the low frequency region. It is in this situation that active control approaches have shown promise. For example, it is known that active forces applied to beam-like structures can attenuate bending waves and the associated flexural power in the media. Also, flexural power flow along finite beams terminated by an arbitrary impedance, which is representative of any structural termination, can be blocked using a single control input. This is in contrast to the usual model approach of attempting to reduce the total vibrational energy in the beam section. An efficient control approach can be implemented if vibrational energy from, e.g., machinery can be confined to the immediate supporting structure prior to dispersion through the overall system.

As mentioned previously, vibrational energy is carried by flexural, extensional and torsional wave forms. It has been shown that significant wave conversion can occur at structural joints due to the coupling inherent in the boundary conditions. For example, extensional waves, although having small out-of-plane displacements, may carry a large amount of energy due to the structure being much stiffer for in-plane motion. On impinging on a discontinuity, these extensional waves may couple strongly to flexural waves with large out-of-plane motion and subsequently radiate large sound levels. Thus it may be deduced that all forms of vibrational waves are important in terms of control of structure-borne sound. Nonetheless, all previous work on control of vibrations in beams appears to have dealt solely with flexural motion.

OBJECTS OF THE INVENTION

It is accordingly an object of the present invention to achieve simultaneous active control of any combination of flexural, extensional and torsional vibrations in elastic beams and other structures.

It is another object of the present invention to achieve this control by reducing the net power flow in these structures.

It is a further object of the present invention to accomplish the foregoing objects in a simple manner.

Other objects and advantages of the present invention are apparent from the specification and drawings which follow.

SUMMARY OF THE INVENTION

Arrays of actuators are affixed to structural elements to impede the transmission of vibrational energy. A single pair is used to provide control of bending and extensional waves and two pairs are used to control torsional motion in addition to these two types of wave motion. The arrays are applied to a wide variety of structural elements such as a beam structure that is part of a larger framework that may or may not support a rigid or non-rigid skin. Electrical excitation is applied to the actuators that in turn generate forces on the structure. These electrical inputs may be adjusted in their amplitude and phase by a controller in communication with appropriate vibrational wave sensors to impede the flow of vibrational energy in all or some of the above mentioned wave forms from the first region to the second region. Additional sensor elements can be used to monitor the performance and adjust the electrical inputs to maximize the attenuation of vibrational energy.

DESCRIPTION OF THE PREFERRED EMBODIMENTS

The present invention involves a method and system for achieving multidegree of freedom, active vibrational control in a simple manner utilizing a minimal number of components. Arrays of actuators are bonded on or embedded in a structural member such that any desired combination of flexural, extensional and torsional waves may be generated in the structural member. Arrays of sensors are also bonded on or embedded in the structural member. These sensors are sensitive to combinations of flexural, extensional and torsional waves present in the beam such that an error signal is derived which is related to the power flow of the particular wave combination present in the structural member at a particular time. A controller is provided to power the actuators to provide an adjustment of the amplitude and phase of the actuator input such that the sensed error signal is optimized, whereby the power flow is minimized. Specific, non-limiting embodiments of the present invention will be described in greater detail below in accordance with these general teachings.

Figure 1:
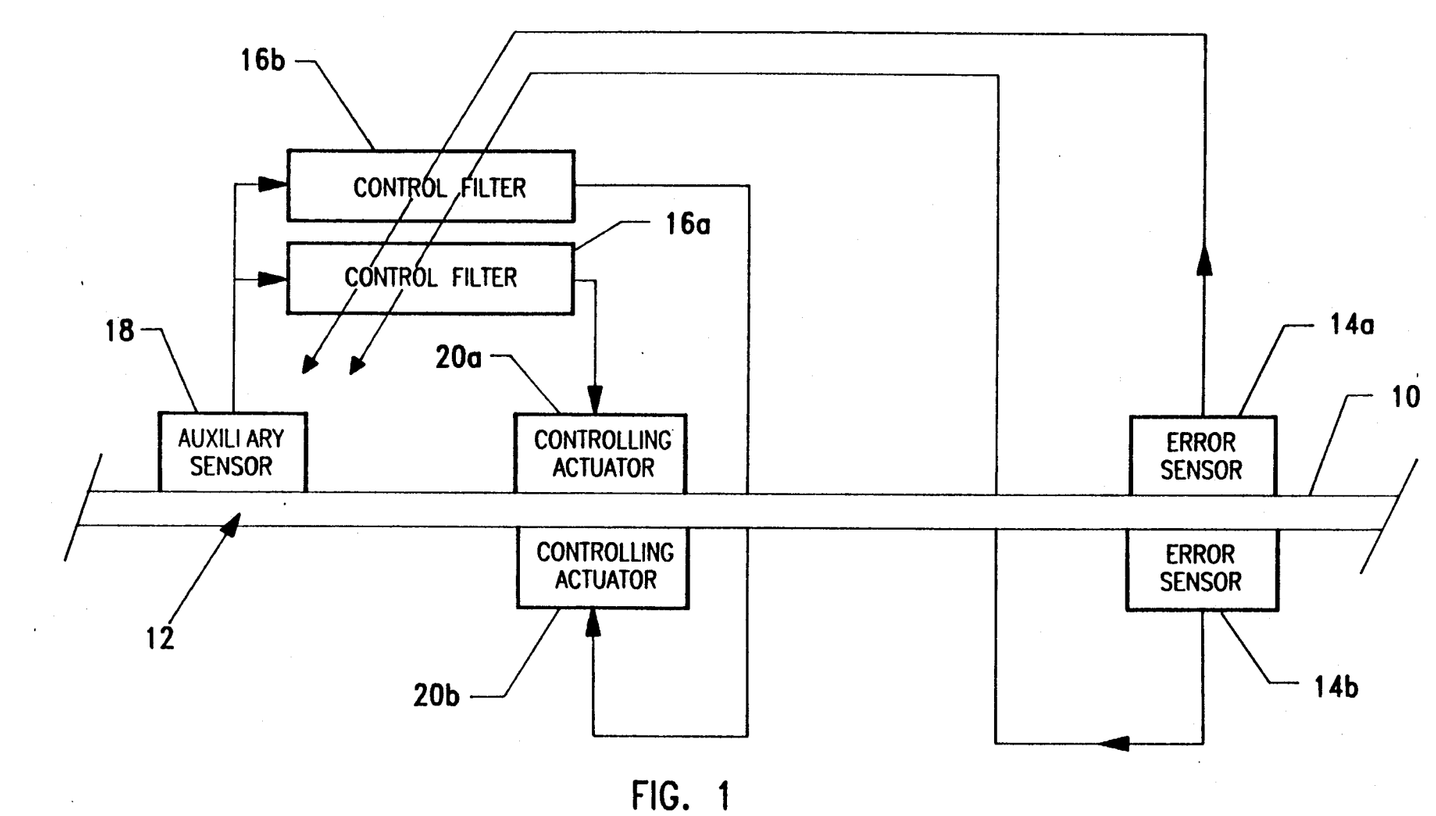
FIG. 1 is a top schematic view of a beam outfitted with sensors and a pair of control actuators to control both flexural and extensional waves.

Referring now to the drawings, an example configuration is depicted in FIG. 1. The structural element or beam may be part of a larger framework that may or may not support a rigid or non-rigid skin. A thin elastic structure, such as elastic beam 10 comprising a first region and a second region mechanically connected or coupled thereto, is transmitting vibration generated by a primary source represented by arrow 12 and which travels to the right in FIG. 1. In this instance, both flexural and extensional waves types are generated in the first region of the beam by the primary source and are sensed by two error sensor elements 14a and 14b affixed to a second region of the beam 10. The error sensors 14a, 14b can be symmetrically located on beam 10 to permit simple wave identification or asymmetrically located on beam 10, necessitating a modification of the wave identification. Error sensors 14a and 14b may be piezoelectric or piezoceramic transducers comprised of, e.g., a lead zirconate titante material embedded in or bonded to beam 10. These transducers 14a, 14b each respectively provide an independent output proportional to surface strain of the beam and are used to derive error signals which provide adjustments to the parameters of control filters 16a and 16b through the computer algorithm controller represented as element 24 (see FIG. 3).

At least one additional auxiliary sensor element 18 may be affixed to beam 10 near the point of application of the primary source in the first beam region or directly to the source 12 and has an output which is fed to the inputs of control filters 16a and 16b. Auxiliary sensor element 18 can be any type of sensor element capable of providing a training signal containing temporal information coherent to the structural vibration caused by the combination of the three wave forms. Sensor element 18 may be a direct electrical output of force source 12. The auxiliary sensor 18 provides this training signal to control filters 16a and 16b and may also be required to adjust the parameters of control filters 16a and 16b through the computer algorithm controller designated as element 24.

The output of each control filter 16a and 16b is respectively fed to independent controlling actuators 20a and 20b affixed to the first region of the beam 10 to provide the necessary adjustment of actuator amplitude and phase as discussed in greater detail below. Like sensor elements 14a, 14b, the controlling actuators 20a, 20b can be piezoelectric or piezoceramic elements comprised of, e.g., lead zirconate titante material, which are embedded in or bonded to beam 10. When such an actuator is so affixed to a beam surface, it effectively induces a surface strain due to its expansion and contraction when excited by an oscillating voltage from the control filters 16a and 16b. These actuators also cause bending of the structure when they are offset from the neutral axis of the beam. In previous techniques the actuators are positioned symmetrically on opposite sides of the beam and driven by the same signal, 180° out of phase. This has the effect of inducing only bending (flexural) motion in the structure when the actuators are symmetrically positioned. In the present invention, the pair of controlling actuators 20a and 20b may be driven in phase to generate extensional motion in the beam. This in-phase and out-of-phase driving assumes that the respective actuators are symmetrically located on beam 10; if asymmetrically located, then appropriate phase differences are employed to achieve these desired motions. Also by independently controlling each actuator, then both extensional motion and flexural motion of varying strengths are simultaneously generated to control both types of wave motion.

An experimental arrangement used in the following description is shown diagrammatically in FIG. 2. Thin aluminum beam 10 had dimensions of 4 m×32.8 mm×7.6 mm and was fitted with a sand anechoic termination 22 for flexural waves at one end to simulate a semi-infinite beam. Previous testing of the termination determined an amplitude reflection coefficient for flexural waves of less than 0.1 for frequencies greater than 200 Hz. Its performance for extensional waves was not known initially, but the experimental results discussed below demonstrate that this is not a critical issue. The primary source was applied as a point force at the free end indicated by arrow 12 via a shaker. In order to generate a combination of flexural waves and extensional waves, the angle at which the primary force was applied relative to the longitudinal axis of the beam was set at approximately 10°. For all tests discussed the primary signal input consisted of a pure sinusoidal tone.

In order to provide control inputs to the beam, two piezoceramic actuator elements 20a and 20b were bonded symmetrically on opposite sides of the beam at a distance of 0.4 m from the free primary end. These elements were approximately 38.1 mm×22.2 mm×0.19 mm in size and were made of lead zirconate titante material. The two independent controlling actuators 20a and 20b were respectively driven from two output channels of the adaptive controller or control system comprising the control filters 16a and 16b and computer algorithm 24 (not shown in FIG. 2). At a distance of 2.15 m from the primary end, two additional like size elements 14a and 14b were bonded symmetrically on either side of the beam and used as error sensors. These two error sensors or transducers 14a and 14b provided two independent error signals used in the adaptive computer algorithm of item 24 in order to adjust the parameters of controller filters 16a, 16b. Specifically, the derived error signals are related to the power flow of the particular wave combination present in beam 10 at a particular time. An additional pair of like size elements, e.g., piezoceramic transducers or auxiliary sensors 19a and 19b were located at 1 m from the free primary end between the control actuators and the error sensors. These auxiliary sensors 19a, 19b provided verification independent from the error sensors 14a, 14b that the controller was indeed performing as indicated, since driving the response at singular points to small values does not necessarily imply global control of the beam vibration.

In order to calibrate the sensors 14a, 14b, 19a, and 19b, the outputs of each sensor were passed through independently controlled amplifiers. The beam was driven with the shaker input normal to the beam surface and it was assumed that in this configuration flexural motion was the dominant response in the structure. The gains of each sensor amplifier were then adjusted so that the output of each piezoceramic sensing transducer pair (14a and 14b) were equal in magnitude. The relative phase of each pair was also checked and found to be within 2° of the required 180° phase shift, confirming that flexural motion was indeed dominant. These amplifier gains were then left undisturbed for all experiments at that frequency.

Figure 3:
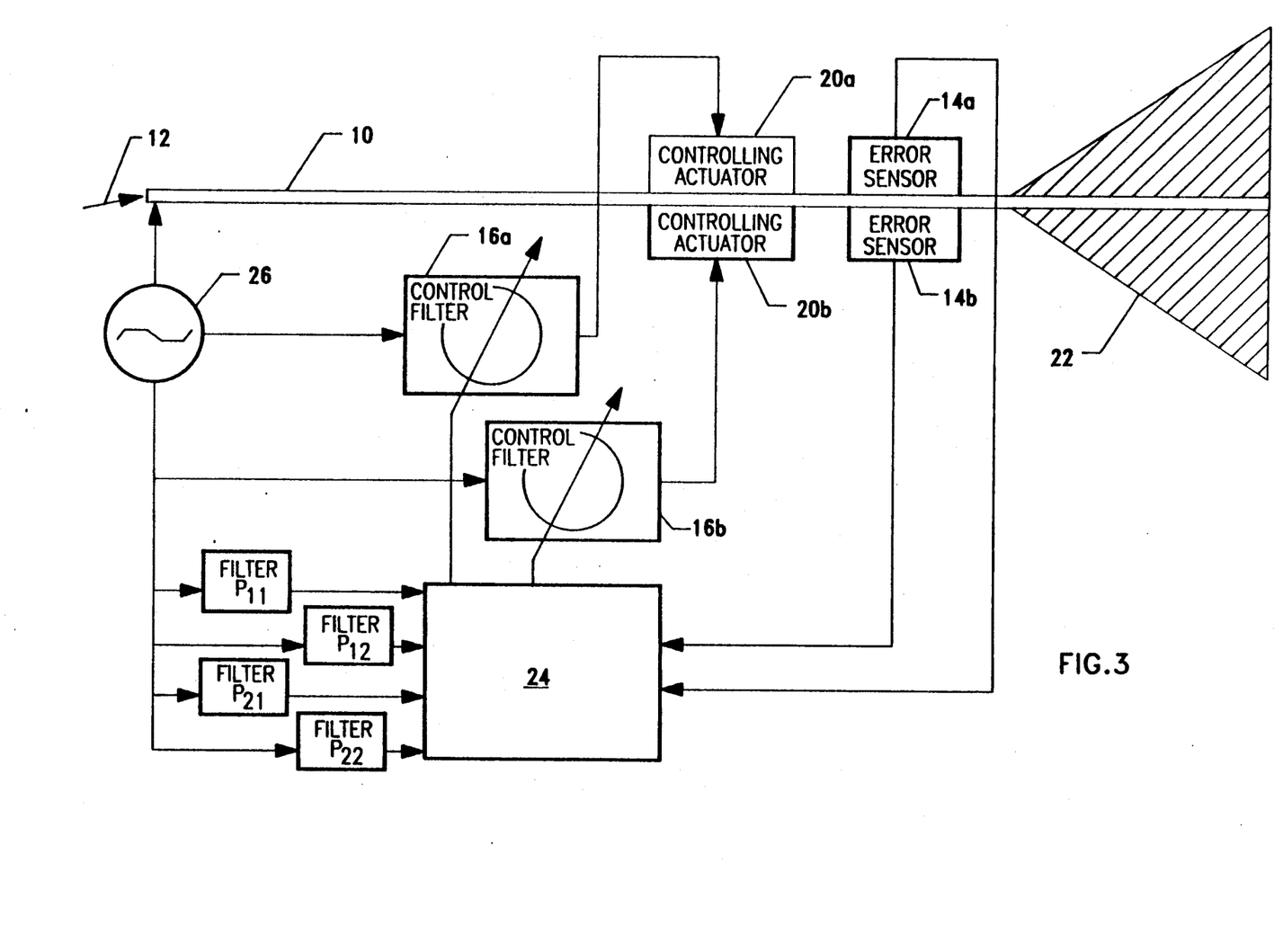
FIG. 3 is a top schematic view of the embodiment of FIG. 2 showing the control apparatus.

Any control program or algorithm may be used so long as the sensed error signal, which is related to the power flow in the structural member from the combination of the three wave forms, is optimized so as to minimize this power flow from the first region to the second region. One particular control algorithm which has been used is based on a multi-channel adaptive Filtered-X least mean squares (LMS) approach described in S. J. Elliott, L. M. Stothers and P. A. Wilson: "A Multiple Error LMS Algorithm and its Application to the Active Control of Sound and Vibration," *IEEE Transaction on Acoustic Speech and Signal Processing*, ASSP-35(1), 1987, pp. 1423-1434. An embodiment of a control system according to the present invention is depicted in block diagram in FIG. 3. As stated previously, the transducer configuration consisted of two paired piezoceramic error sensors 14a and 14b and two paired piezoceramic actuators 20a and 20b affixed symmetrically to the beam. The output of an error sensor 14a, 14b can be modeled at the n'th time step as:

$$\theta_l(n) = d_l(n) + \sum_{m=1}^{M} \sum_{j=0}^{N-1} P_{lmj} \sum_{i=0}^{N-1} W_{mi}(n-i)x(n-i-j) \quad (1)$$

where $d_l(n)$ is the lth error sensor output due to the primary or noise source alone, $x(n)$ is the input reference source, $W_{mi}$ are the coefficients of the adaptive FIR filters and $P_{lmj}$ is the j'th coefficient of the transfer function between the output of the m'th adaptive filter and the l'th error sensor. M and N are the number of control actuators and filter coefficients respectively.

The object of the LMS algorithm is to minimize the mean square error signal defined as:

$$J = E\left[\sum_{l=1}^{L} \theta_l^2(n)\right] \quad (2)$$

where E is the expectation operator. This error function can be shown to be quadratic and thus theoretically has one minimum solution.

At each sample time n, the outputs of the compensating filters $\hat{P}_{lmj}$, in this case $\hat{P}_{11}$, $\hat{P}_{12}$, $\hat{P}_{21}$ and $\hat{P}_{22}$ inclusive of all coefficients j, were used by the LMS algorithm controller 24 to minimize J by individually updating each of the adaptive filter coefficients according to the relation:

$$W_{mi}(n+1) = W_{mi}(n) - \mu \sum_{l=1}^{L} \theta_l(n)r_{lm}(n-i) \quad (3)$$

where $$r_{lm}(n-i) = \sum_{j=0}^{N-1} \hat{P}_{lmj}x(n-i-j) \quad (4)$$

Note that $e_l(n)$, the instantaneous error function value, is taken as an estimate of the expected value of $e_l(n)$. This function provides an estimate of $e_l(n)$ at every sample and convergence is found to occur in the mean. In Equation (3), L is the total number of error sensors employed and $L \geq M$. The $r_{lm}(n)$ are the outputs of the compensating filters $\hat{P}_{lmj}$ (see FIG. 3) which are estimates of the actual coefficients, $P_{lmj}$, measured prior to starting the control algorithm. This procedure is necessary as the LMS algorithm assumes that the error $e_l(n)$ is the instantaneous result of the control input for which the signal $r_{lm}(n)$ is a better estimate than $x(n)$. The factor $\mu$ in Equation (3) is a stability parameter by which rate of convergence can be varied.

For the following tests, a steady state sinusoidal wave was used as a noise signal. It was taken from a reference oscillator 26 that also provided the training or reference signal for the LMS adaptive controller 24. With this arrangement it was unnecessary to model the feedback path present if, e.g., the training signal had been taken from the beam response.

It can be shown that a sinusoidal signal can be arbitrarily modified in amplitude and phase by using a finite impulse response filter with two coefficients and this number was used in all filters. For simultaneous wave control experiments, two control actuators and two sensors were used, thus, in this case M and L were taken as 2. However, for some additional comparison tests, the paired control actuators and the sensors were respectively hard-wired together forming a single control channel and thus in this case M and L were taken as 1.

It should also be noted that the variable being minimized in this embodiment is the sum of the squared voltages outputs of the error sensors. As this variable is related to the square of the strain in the beam, the error signal can be seen to be proportional to the vibrational energy at that point. Minimizing this variable globally, or at a number of points, implies control of vibrational power flow for flexure and extension in this configuration.

The algorithm was implemented on a TMS320C25 digital signal processing chip with an IBM AT as a host computer, with up to three A/D converters and two D/A converters. The LMS algorithm provided control inputs to the two piezoceramic elements 20a and 20b as dictated by error information from the two sensing piezoceramic elements 14a and 14b. For control of both wave types, the system used two input and two output channels at a sample rate of 8 kHz. On average the controller converged to 10 dB reduction in 30 msec. For some subsidiary tests the controller was used in a single input, single output configuration.

Figure 4:
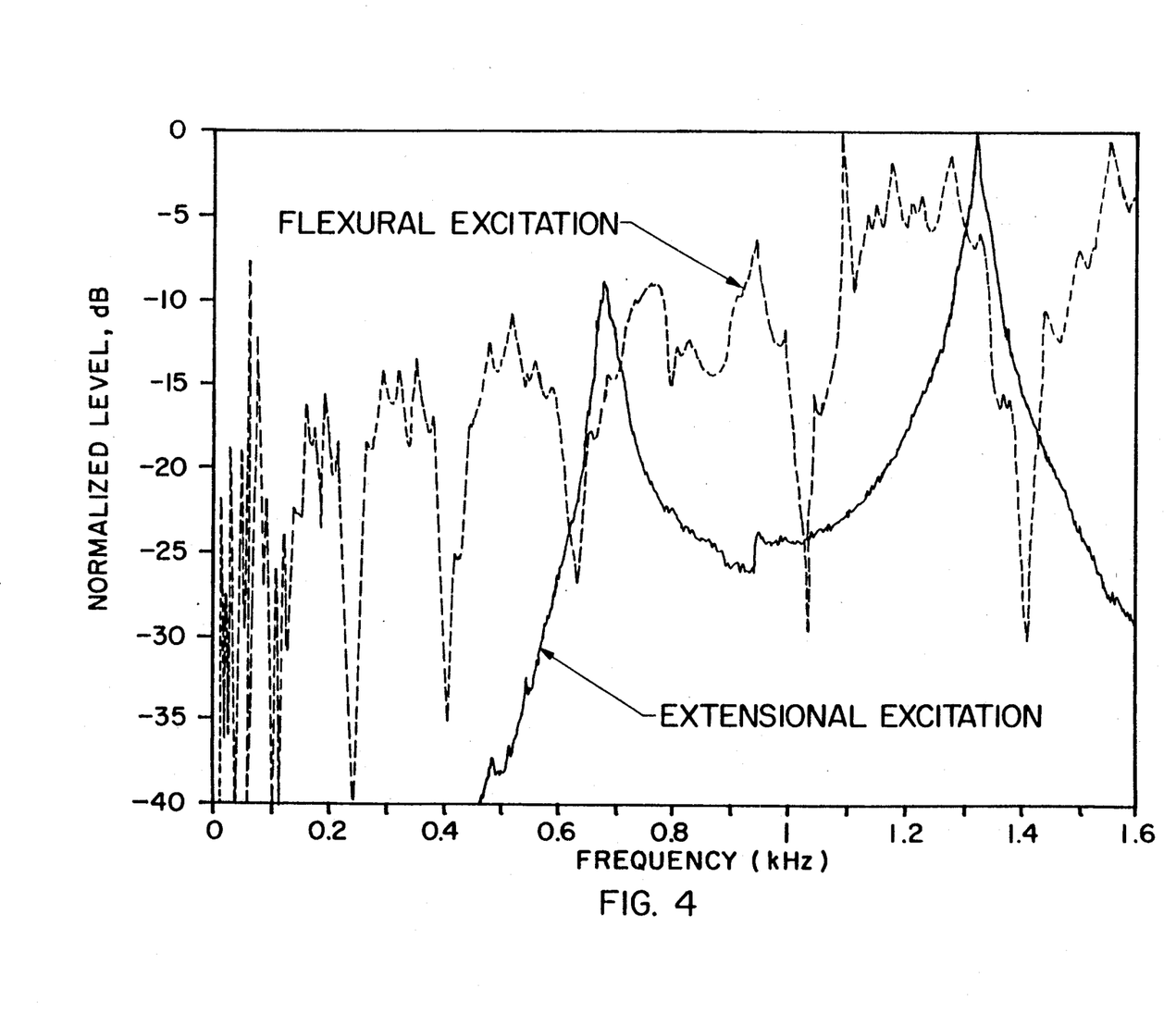
FIG. 4 is a graph showing a typical normalized strain response at a sensor of the outfitted beam to extensional and flexural excitation by the actuators.

In order to determine reasonable test conditions, the beam response to separate extensional and flexural excitations was examined. The electrical signals from each pair of adjacent sensor elements were summed and differenced which provided signals corresponding to the extensional and flexural wave components, respectively. The appropriate response derived from the error sensor array 14a, 14b (2.15 m) is shown in FIG. 4 for the two excitation conditions. The extensional wave excitation was obtained by inputting random noise to the control transducers 20a and 20b with both being driven in-phase. This produced a response that was primarily an extensional wave and the summed array output indicates extensional resonances at 657 Hz and 1312 Hz. The response was normalized to the peak for this excitation.

To examine the flexural response, the control actuators 20a and 20b were again excited by random noise but this time with inputs 180° out of phase. This produced the differenced output at the error sensors 14a and 14b corresponding to the flexural wave response. This response was again normalized to its peak value and clearly demonstrated the effectiveness of the termination to flexural waves. The nulls in the response correspond to the reflections from the primary end and are not present in responses driven by the primary shaker.

and 16.1 dB less than the extensional response at 2.15 meter.

TABLE I

| | Attenuation (dB re no control) Under Three Control Conditions for 704 HZ | | | |
|---|---|---|---|---|
| | Auxiliary Sensors 19a, 19b (1.0 m From Free Primary End) | | Error Sensors 14a, 14b (2.15 m From Free Primary End) | |
| Test Condition | Extensional (summed) dB | Flexural (differenced) dB | Extensional (summed) dB | Flexural (differenced) dB |
| Flexural Control | 0.054 | 17.0 | 0.055 | 31.0 |
| Extensional Control | 39.1 | −12.8 | 32.6 | −4.79 |
| Flexural-Extensional Control | 34.6 | 25.4 | 36.3 | 20.5 |

The lack of significant resonance peaks is in strong contrast to the extensional wave case where the termination is not effective. Thus for flexural waves, the differenced sensor output approximates a measure of the net power flow. However, this is not the case for extensional waves.

Using these results, frequencies of 704 Hz and 1312 Hz were chosen as test conditions to allow for the limited excitation capability of the piezoceramic actuators and the tendency of the beam to respond strongly in flexure due to the primary input. At these frequencies, near extensional resonances, comparable responses in each beam motion were recorded. It is far more difficult to generate extensional motion than flexural due to the greater beam stiffness in this plane of vibration.

For the baseline response, no control was exercised over the primary excitation. The extensional and flexural responses from the summed and differenced sensor outputs provided the baseline against which the control cases were measured. The results in Tables I and II are normalized to this baseline response.

In order to control only the flexural response, the two inputs of the symmetrical piezoceramic actuator inputs were hard wired so as to be driven 180° out of phase by the single channel control excitation. Similarly, the differenced output of the error sensors was used as the single control variable with the output of the controller driving the above control excitation.

For the control of only extensional beam response, the two symmetrical actuators were hard wired in-phase to create a single extensional control actuator. This arrangement was used in a single channel controller to drive the summed error sensors to a minimum resulting in control of the extensional wave response.

Finally, simultaneous control of both flexural and extensional response was implemented by driving each control actuator 20a and 20b as an independent control variable and using the primary output of each sensor element 14a and 14b as an error signal indicative of the presence of flexural and/or extensional waves. In this configuration, no derived signals are used in the controller implementation. This provided better equalization of overall levels between the sensor and actuator elements than if the summed and differenced signals had been used.

Table I presents the summed and differenced outputs of the piezoceramic elements 19a, 19b and 14a, 14b respectively located at 1.0 m and 2.15 m. As stated previously, the transducers 14a, 14b at 2.15 m were used to provide the error signals for the adaptive controller. The results are presented in terms of attenuation in decibels relative to the respective sensor output with no control applied. For no control, the flexural response was 11.8 dB less than the extensional response at 1.0 m When the flexural vibrations were controlled, the summed error signals, corresponding to extensional motion, show little attenuation while the differenced outputs corresponding to flexural motion demonstrated attenuations of 17 and 31 dB at beam locations of 1.0 m and 2.15 m, respectively. This implies a significant reduction in the flexural motion with little control of extensional as dictated by the fixed out-of-phase relationships of the control transducers sensing and inputting primarily flexural wave motion.

For control of extensional motion the reverse situation is true, with attenuations of 39.1 and 32.6 dB of the extensional response, and an increase in flexural motion of 12.8 and 4.8 dB at 1.0 m and 2.15 m respectively. Here the fixed in-phase relationship of the control transducers allowed control of only the extensional motion. Some flexural motion is thought to be excited by the controller actuators not being perfectly matched.

Finally, when simultaneous control of both motions was exerted, attenuations of 20.5 dB or greater in bending and 34.6 dB or greater in extensional control were observed. In this case, both the actuator and sensor transducer pairs are left as independent single elements and the controller finds it optimal solution by driving both error signals from sensors 14a and 14b to low values simultaneously. By separately summing and differencing the sensor pairs, it could be deduced, as shown in Table I, that both the flexural and extensional motion are simultaneously controlled. The similar trends of both piezoceramic sensor arrays indicate that an overall reduction of power flow beyond the control actuator has occurred.

Figure 2:
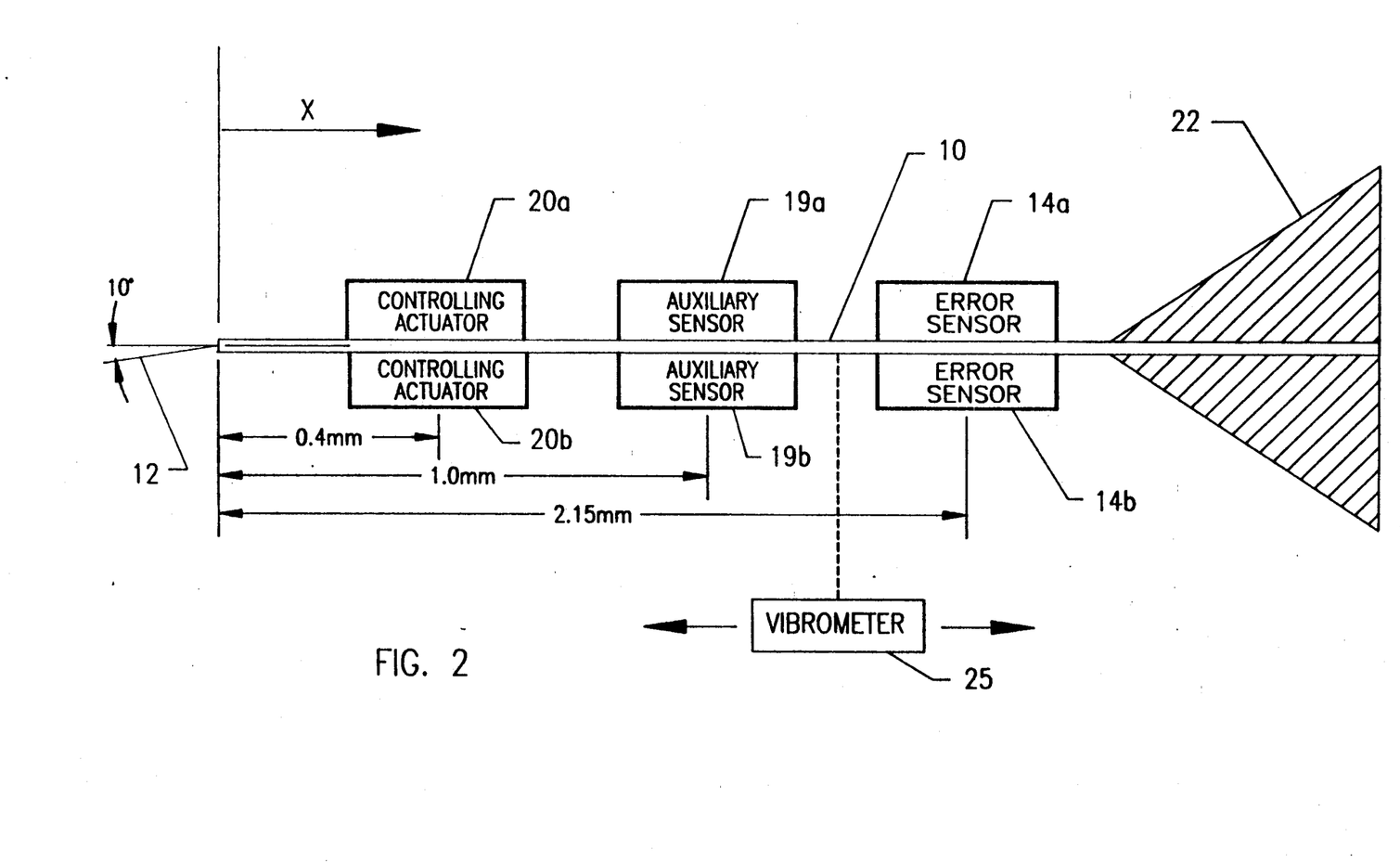
FIG. 2 is a top schematic view of a embodiment of the present invention used to generate the test results discussed below.
Figure 5:
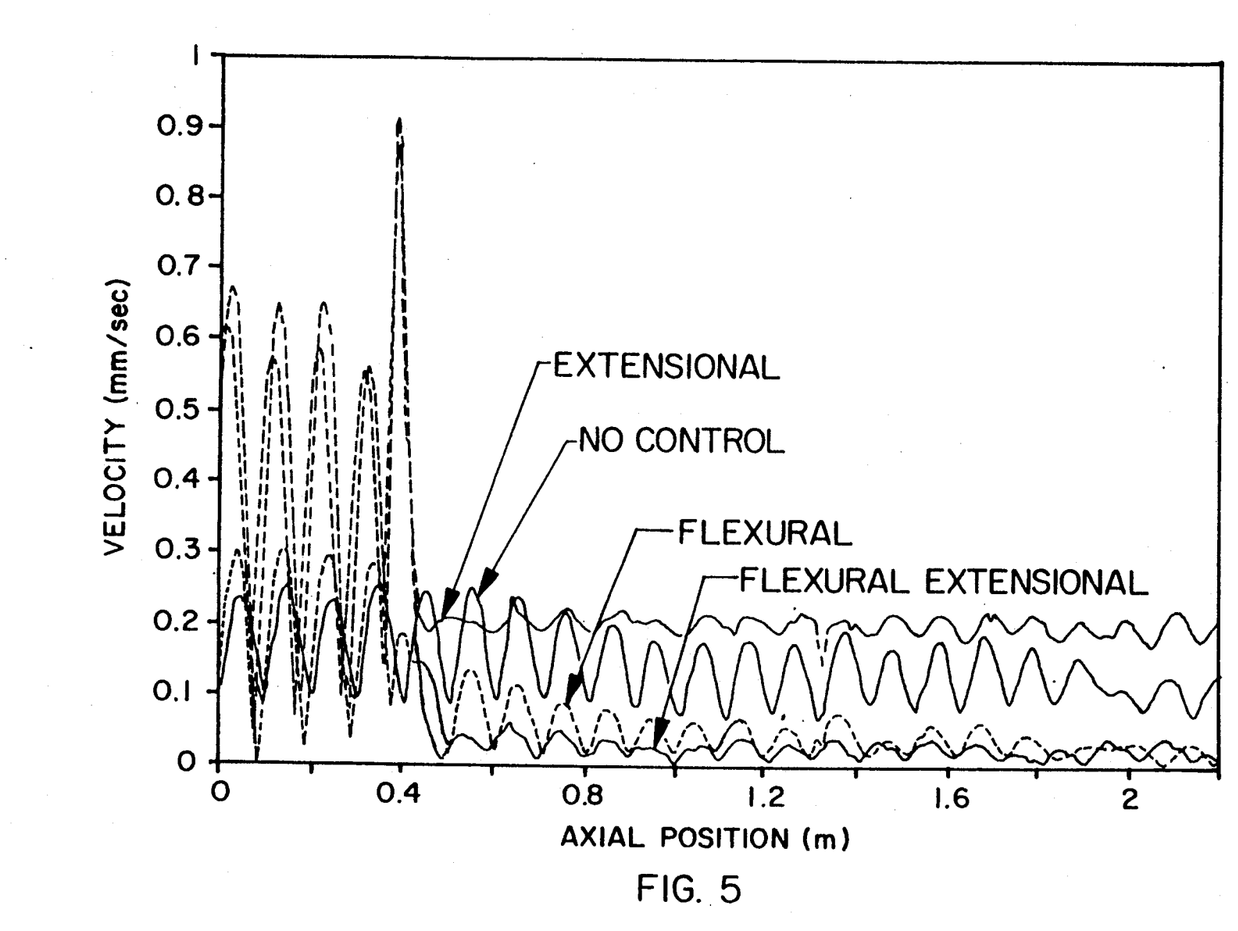
FIG. 5 is a graph showing the axial distribution of the flexural velocity in the outfitted beam for four test conditions at 704 Hz.

As a further confirmation of the extent of control, the axial distribution of beam out-of-plane velocity is shown in FIG. 5 for test conditions at 704 Hz, measured by an axially scanning laser vibrometer 25 (see FIG. 2). This instrument, when interfaced with a spectral analyzer and plotter, provided plots of the beam flexural vibrational velocity amplitude versus axial location. The results show that the beam velocity is reduced significantly for the cases of flexural control alone and simultaneous flexural-extensional control. For the no control case there is a significant standing wave on the beam for flexural motion which is significantly reduced when extensional control is used. This result illustrates the wave conversion phenomena discussed previously and is most likely due to extensional waves generating flexural motion at the beam termination as the termination is not anechoic for extension. The standing wave reappears when flexural control is employed and is suppressed when both flexural and extensional control is used.

FIG. 5 also shows a long wavelength modulation in the standing wave of the out-of-plane velocity for the no control case. This effect is thought to be caused by the out-of-plane motion due to Poisson's coupling of the extensional motion standing wave which is of much longer wavelength. It is also apparent from FIG. 5 that although there is significant standing wave to the left of the control actuators, the control inputs reduce the beam response to the right of their location. This result should be contrasted to modal approaches in which an axial distribution of control actuators are required. As the beam displacement in both extension and flexure is highly attenuated along the beam length, it can be concluded that the total vibrational power flow in the beam except for the torsional component has been controlled.

Figure 6:
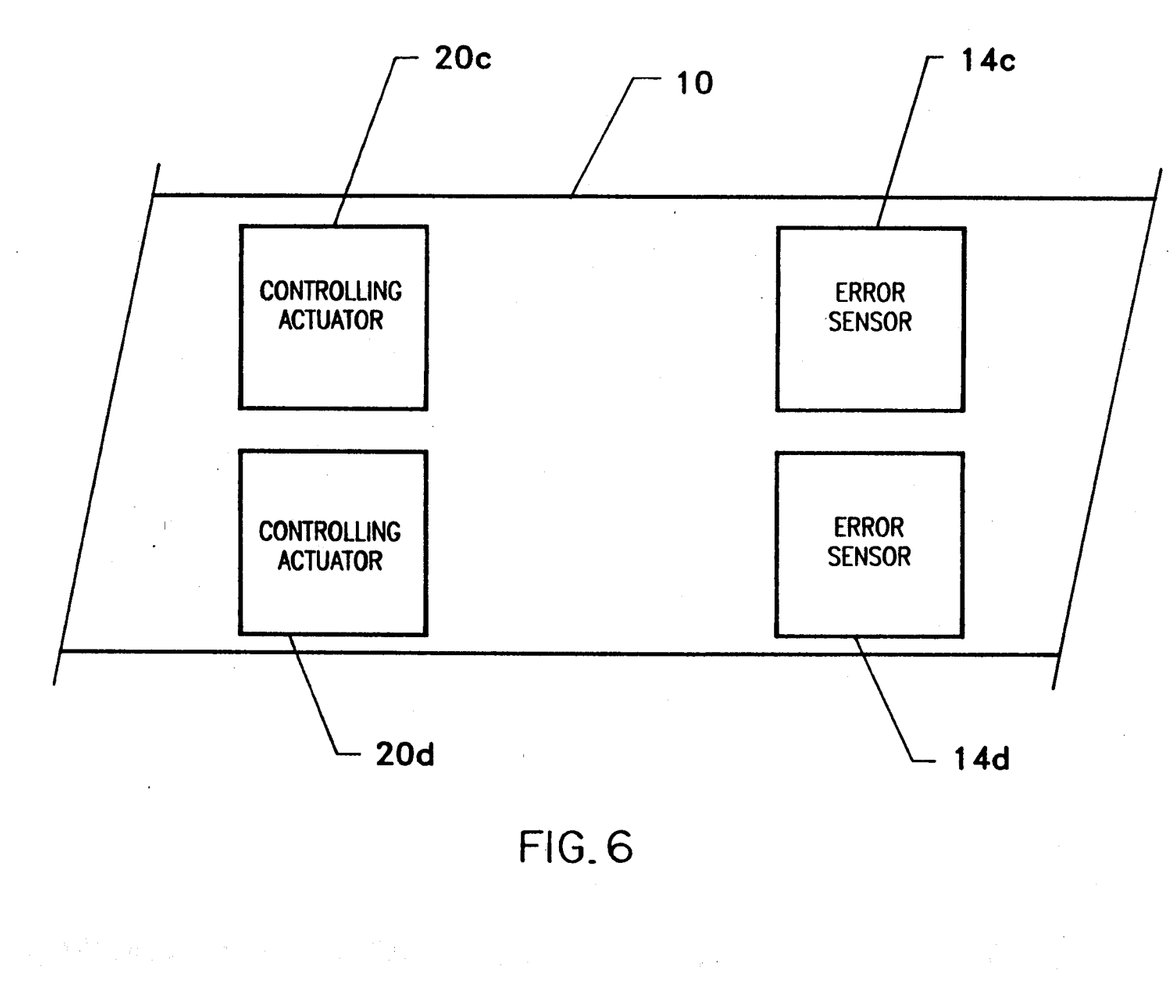
FIG. 6 is a side view of a beam outfitted with two pairs of sensors and two pairs of control actuators to control flexural, extensional and torsional motion.

Similar results were found for the 1312 Hz case. These results are presented in Table II for both the auxiliary sensor array 19a, 19b at 1.0 m and the error sensor array 14a, 14b at 2.15 meter. For control of flexural response, attenuations at 33.0 and 41.7 dB were recorded at 1.0 m and 2.15 m, respectively. Little change was affected at either location for the extensional response in this case. As expected for extensional motion control, the reverse was found to be true with attenuations of greater than 10 dB for the extensional response and less than 1 dB for the flexural response. The case for controlling both extensional and flexural response show excellent control with the extensional response attenuated by 24 dB or greater and flexural response attenuated by 36 dB or greater. The axial velocity distributions measured by the laser vibrometer yielded similar results to FIG. 5 except that the flexural response did not measurably increase for the extensional control case. This is shown in the results of Table II.

top and bottom sections. Driving both pairs of control actuators 20c and 20d in-phase corresponds to the previously discussed driving of actuators 20a, 20b in their use to control both flexural and extensional vibrations. However, driving the pairs 20c and 20d out-of-phase will force the beam structure into a torsional motion. This in-phase and out-of-phase driving assumes that the respective actuators are symmetrically located on beam 10; if asymmetrically located, then appropriate phase differences are employed to achieve these desired motions. This is due to their respective locations above and below the neutral axis of the beam. Similarly, the sensor element pairs 14c and 14d will independently sense all three modes of vibration and provide an error sensor input to a four-channel controller system based on the design of FIG. 3. Four control filters will now be required and the number of sensor and actuator elements M and l of equations (1), (2) and (3) will be required to be four. The present invention will thus minimize the power flow generated by any combination of flexural, extensional and torsional waves.

Many modifications, improvements, and substitutions will be apparent to the skilled artisan without departing from the spirit and scope of the present invention as described herein and defined in the following claims.

What is claimed is:

1. A vibration transmission control apparatus for a structure comprising a first region subject to an input vibration and a second region mechanically connected to the first region, the apparatus comprising:

an array of actuators located at the first region of the

TABLE II

| | Attenuation (dB re no control) Under Three Control Conditions for 1312 Hz | | | |
|---|---|---|---|---|
| Sensor Position | Auxiliary Sensors 19a, 19b (1.0 m From Free Primary End) | | Error Sensors 14a, 14b (2.15 m From Free Primary End) | |
| Test Condition | Extensional (summed) dB | Flexural (differenced) dB | Extensional (summed) dB | Flexural (differenced) dB |
| Flexural Control | −0.81 | 33.0 | 0.51 | 41.7 |
| Extensional Control | 9.8 | 0.25 | 46.4 | −0.05 |
| Flexural-Extensional Control | 23.9 | 36.6 | 27.7 | 40.2 |

The simultaneous active control of flexural and extensional motion in beams has thus been experimentally studied and validated. The results show that by using two co-located piezoceramic elements as actuators and sensors in conjunction with a multi-channel adaptive controller, simultaneous attenuation of both extensional and flexural motion is achievable. This characteristic is due to the nature of the piezoceramic element which when bonded to the surface of a structure and activated by an oscillating voltage generates corresponding oscillating strain distributions which couple to flexural and extensional waves in the structure. In contrast to a normal point force input, such as an electrodynamic shaker, this enables excitation and sensing of both in-plane and out-of-plane motion.

Referring now to FIG. 6, a further embodiment of the present invention is shown which controls torsional wave propagation in addition to the control of flexural and extensional waves as discussed above. A first pair of oppositely located control actuators 20c (one shown) and a second pair of oppositely located control actuators 20d (one shown) are affixed to beam 10 as discussed previously above and below the centerline of the beam as oriented in FIG. 6. Also, a first pair of oppositely located error sensors 14c (one shown) and a second pair of oppositely located error sensors 14d (one shown) are likewise affixed to beam 10 as discussed above in these structure for generating a desired combination of flexural, extensional, and torsional waves in the first region;

an array of sensors located at the structure which are sensitive to any combination of flexural, extensional, and torsional vibrational waves present in the structure, such that an error function is derived which is related to a vibrational power flow from the first region to the second region; and a controller for powering the actuators and adjusting the amplitude and phase inputs of the actuators such that the error function is minimized, whereby the vibrational power flow into the second region is minimized.

2. The vibration transmission control apparatus according to claim 1, wherein said actuators expand and contract in response to a controlling voltage from said controller.

3. The vibration transmission control apparatus according to claim 2, wherein said actuators are either piezoelectric or piezoceramic elements.

4. The vibration transission control apparatus according to claim 1, wherein said error sensors are either piezoelectric or piezoceramic elements.

5. The vibration transmission control apparatus according to claim 1, further comprising an auxiliary sensor located at the structure for sensing the presence of flexural, extensional and torsional waves in the structure independently of said sensors, said auxiliary sensor in communication with said controller wherein an auxiliary signal is provided to ensure the error function is minimized, whereby the vibrational power flow into the second region is minimized.

6. The vibration transmission control apparatus according to claim 1, wherein said controller employs an algorithm to minimize the sum of the squared sensor outputs of all of the sensors to independently control said actuators.

7. The vibration transmission control apparatus according to claim 1, wherein said actuators are symmetrically located at the first region and wherein said controller drives said actuators in phase to generate extensional motion in the structure or out of phase to generate flexural motion in the first region of the structure.

8. The vibration transmission control apparatus according to claim 1, wherein a pair of sensors are sensitive to a combination of flexural and extensional waves and a pair of actuators generates a combination of flexural and extensional waves in the first region of the structure.

9. The vibration transmission control apparatus according to claim 8, wherein another pair of sensors are added to said sensor array such that said sensor array is sensitive to torsional waves and another pair of actuators generates torsional waves in the structural member.

10. The vibration transmission control apparatus according to claim 1, further comprising a signal generator for generating a training signal containing temporal information coherent with the dominant vibrational wave present, the training signal being communicated to said controller to adjust the control of said actuators to further optimize the error function so that vibrational power flow from the first region into the second region is minimized.

11. A method of controlling vibration transmission in a structure comprising a first region subject to an input vibration and a second region mechanically connected to the first region, the method comprising the steps of:
sensing any combination of flexural, extensional and torsional waves present in the structure;
deriving an error function from the sensed presence which is related to a vibrational power flow into the second region from the first region;
controlling an array of actuators to generate a desired combination of flexural, extensional, and torsional waves in the first region such that the error function is minimized, whereby the vibrational power flow into the second region is minimized.

12. The vibration transmission control apparatus according to claim 1, wherein said array of sensors is located at the second region of the structure.

13. The vibration transmission control apparatus according to claim 5, wherein the auxiliary sensor is located at the first region of the structure.

14. The vibration transmission control apparatus according to claim 5, wherein the auxiliary sensor is located at the first region of the structure between said array of actuators and the input vibration.

15. The method according to claim 11, further comprising determining the presence of flexural, extensional and torsional waves in the structure independently of said sensing step, wherein an auxiliary signal is provided to minimize the error function, whereby the power flow to the second region is minimized.

16. The method according to claim 12, wherein said auxiliary signal determining step comprises sensing the presence of the waves in the first region.

* * * * *